United States Patent
Zorn et al.

(10) Patent No.: US 8,856,333 B2
(45) Date of Patent: Oct. 7, 2014

(54) DATACENTER EXECUTION TEMPLATES

(75) Inventors: Benjamin G. Zorn, Woodinville, WA (US); Jeffrey T Cohen, Issaquah, WA (US); Dennis B. Gannon, Bellevue, WA (US); Emre M. Kiciman, Seattle, WA (US); George M. Moore, Redmond, WA (US); Stuart H. Schaefer, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 1213 days.

(21) Appl. No.: 12/485,670

(22) Filed: Jun. 16, 2009

(65) Prior Publication Data

US 2010/0318658 A1    Dec. 16, 2010

(51) Int. Cl.
G06F 15/173    (2006.01)
G06F 9/50    (2006.01)

(52) U.S. Cl.
CPC .................................. *G06F 9/5066* (2013.01)
USPC ......................................... 709/226; 709/223

(58) Field of Classification Search
CPC .................................................... G06F 9/5066
USPC ................................................. 709/226, 223
See application file for complete search history.

(56) References Cited

U.S. PATENT DOCUMENTS

| 6,857,020 | B1 | 2/2005 | Chaar et al. | |
| 7,448,022 | B1 | 11/2008 | Ram et al. | |
| 7,500,236 | B2* | 3/2009 | Janzen | 717/174 |
| 2005/0246726 | A1 | 11/2005 | Labrou et al. | |
| 2006/0015589 | A1* | 1/2006 | Ang et al. | 709/220 |
| 2006/0015866 | A1* | 1/2006 | Ang et al. | 717/174 |
| 2009/0125891 | A1* | 5/2009 | Garimella et al. | 717/131 |
| 2009/0150857 | A1* | 6/2009 | Srinivasan et al. | 717/104 |
| 2009/0183146 | A1* | 7/2009 | Zorn | 717/168 |
| 2010/0138811 | A1* | 6/2010 | Jayaraman et al. | 717/125 |
| 2012/0246004 | A1* | 9/2012 | Book et al. | 705/14.58 |

OTHER PUBLICATIONS

Athreya, et al., "Oracle Database 11g: Real Application Testing and Manageability Overview", retrieved on May 24, 2010 at <<http://www.oracle.com/technology/products/database/oracle11g/pdf/real-application-testing-whitepaper.pdf>>, Oracle Corporation, Jun. 2007, pp. 1-21.

"Chapter 1 An Overview of the N1 Service Provisioning System Software", retrieved on May 25, 2010 at <<http://docs.sun.com/app/docs/doc/817-4822/6mkaqahcl?l=view>>, Oracle Corporation, Feb. 2004, pp. 1-16.

Foster (ed.), et al., "Open Grid Services Architecture Use Cases", retrieved on May 24, 2010 at <<http://www.gridforum.org/documents/GWD-I-E/GFD-I.029v2.pdf>>, Global Grid Forum, Oct. 28, 2004, pp. 1-74.

(Continued)

*Primary Examiner* — Mohamed Wasel
(74) *Attorney, Agent, or Firm* — Dan Choi; Judy Yee; Micky Minhas

(57) ABSTRACT

Deployment and execution of a service in a multiple datacenter environment may be facilitated using datacenter execution templates. Developers, business managers, and other interested parties may select and/or modify a declarative execution template embodying multiple factors. The execution template may then be used to generate an execution plan, which is then executed by datacenters which run the service. The execution template may be optimized after deployment of the service, allowing for ongoing adjustment in response to changing business, regulatory, and operational factors.

20 Claims, 8 Drawing Sheets

(56) References Cited

OTHER PUBLICATIONS

Gannon, "The Computational Datacenter: Building Science Clouds", retrieved on May 24, 2010 at <<http://www-conf.slac.stanford.edu/icfa2008/gannon103008.pdf>>, ICFA Seminar, Standford National Accelerator Laboratory, Menlo Park, CA, Oct. 2008, pp. 1-30.

Graupner, et al., "Resource-Sharing and Service Deployment in Virtual Data Centers", retrieved May 25, 2010 at <<http://ieeexplore.ieee.org/stamp/stamp.jsp?tp=&arnumber=1030845>>, IEEE Computer Society, Proceedings of International Conference on Distributed Computing Systems Workshops (ICDCSW), 2002, pp. 666-674.

"Introducing newScale 9—the Sexiest IT StoreFront Ever!", retrieved on May 25, 2010 at <<http://www.servicecatalogs.com/market/>>, Service Catalog Community and Blog (online), Jun. 12, 2007, pp. 1-20.

\* cited by examiner

DATACENTER EXECUTION TEMPLATES

BACKGROUND

Datacenters maintained by a service host provide resources for service providers to operate an increasing variety of information services. Current highly complex datacenters may incorporate hundreds or thousands of computing and networking devices such as servers, routers, load balancers, caches, etc., which may be distributed across many modules, containers, backbones, floors, buildings, etc. As demand increases, the complexity of the datacenter environment will continue to grow.

Before the advent of highly complex datacenters, business managers, developers, and datacenter operators made numerous assumptions in the design, provisioning, and deployment of services. The ability to measure performance and respond to dynamic conditions was crude. Services were built and deployed to particular pieces of hardware in a particular datacenter. Changes to those builds and deployments were possible, but at considerable effort and cost. Government regulation of information services was small to non-existent.

Given these prior conditions contractual arrangements, such as service level agreements (SLAs), to provide resources to service providers were necessarily limited. Primitive conditions resulted in primitive SLAs. As a result, the increasing complexity of the datacenter and the ability to optimize datacenter resources has outstripped those traditional SLAs. Instead of one massive server specified in an SLA executing a service, the service may now execute on an array of virtual machines instantiated on demand across multiple pieces of hardware located in datacenters across many borders. Government regulations have evolved to recognize and regulate services provided by datacenter resources. Monitoring and control has grown richer and more dynamic, allowing better operational control. Service developers may not know, or care to know, where or on what hardware the service will run. Service hosts may not be aware of considerations unique to the service and/or preferences of the developer. The coarse nature of the traditional SLA prevents optimization of existing resources, as well as the presentation and implementation of new operational boundaries.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A service may be deployed and executed in a datacenter environment using datacenter execution templates. Developers, business managers, and other interested parties may select and/or modify a declarative execution template embodying multiple factors which may be dependent or independent of one another. These factors may include latency of response, datacenter throughput, energy consumption, data storage, legal impacts, environmental impacts, etc. Additionally, an estimated cost and performance of the service resulting from using various execution templates may be generated and compared.

The execution template may then be used to generate an execution plan. The execution plan may be implemented as a program written in a programming language, graph, extensible markup language (XML), configuration file, and so forth to allow automated provisioning and deployment of the service. The execution plan may then be implemented in one or more datacenters and/or other network resources. The execution plan may operate at varying levels of granularity including multiple datacenters, individual datacenters, server containers, and discrete pieces of hardware.

While the service is running in one or more datacenters, the execution template may be optimized dynamically, allowing for ongoing adjustment of the service in response to the changing environment of the datacenter(s) and/or preferences of the interested parties. Optimization includes modification of parameters until reaching a pre-determined threshold. This optimization may use actual or simulated data to test alternatives which are permissible within the constraints of the execution template. Once an optimized execution template is determined, it may be used to generate an updated execution plan, which may then be deployed in the datacenter(s).

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

This disclosure describes use of execution templates in the deployment of services executing in a datacenter. Developers, business managers, and other interested parties may select and/or modify a declarative execution template embodying involving multiple factors. These factors may include latency of response, datacenter throughput, energy consumption, data storage, legal impacts, environmental impacts, etc. Templates may be constructed which minimize environmental impact, maximize datacenter throughput, maximize profit, minimize user delay, etc.

Interested parties may also generate scenarios for comparison, such as estimated costs and environmental impact on the service resulting from different execution templates. A business manager may see estimates as to the impact on service levels resulting from different execution templates. For example, the business manager may view estimated service levels for a template minimizing environmental impact and compare to another template configured to minimize user delay. In contrast to the flexibility afforded by execution templates, traditional SLAs were static documents with coarse parameters. Thus it was not possible to easily compare a variety of SLA options and determine impact across multiple dimensions such as financial, operational, environmental, etc.

Once selected, an execution plan is generated from the execution template. This execution plan may be implemented as a program written in a programming language, graph, extensible markup language (XML), configuration file, and so forth to allow automated provisioning and deployment of the service. For example, the execution plan may comprise a script designating the acceptable parameters for the service. The execution plan may be executed, deploying the service across network resources such as discrete hardware devices, servers, containers, datacenters, and so forth. Furthermore, the execution template and execution plan may be used to determine whether the service host has provided the services contracted for by the service provider.

After deployment, the execution template may be optimized dynamically, allowing for ongoing adjustment of the service in response to the changing environment of the datacenter(s). Optimization includes modification of parameters until reaching a pre-determined threshold. This optimization may use actual or simulated data to test alternatives which are permissible within the constraints of the execution template. Once an optimized execution template is determined, it may be used to generate an updated execution plan, which may then be deployed to the datacenters.

Generating and Using Execution Plan

Figure 1:
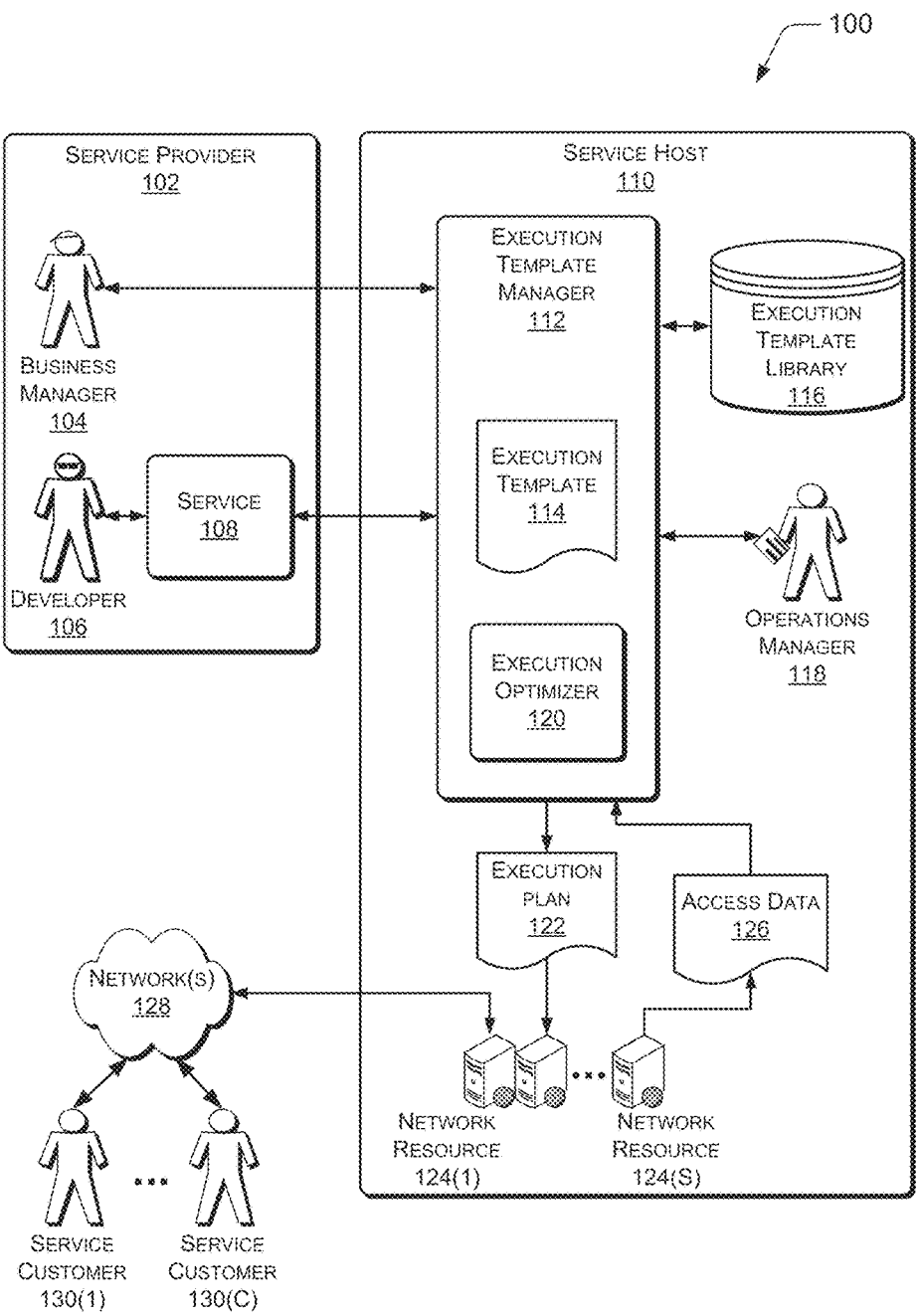
FIG. 1 is block diagram of an illustrative process of generating an execution template of a service, optimizing the execution template, and generating an execution plan for deployment across network resources.

FIG. 1 shows a process 100 of generating an execution template and execution plan for deployment to network resources. The process 100 (as well as processes of FIGS. 3 and 4) is illustrated as a collection of blocks in a logical flow graph, which represent components and data structures that may be implemented in hardware, software, or a combination thereof. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process.

A service provider 102 is depicted which may include a business manager 104 and a developer 106, for example. In collaboration with business manager 104, developer 106 may construct service 108. Service 108 comprises the code necessary to implement a service application in a datacenter environment including one or more service hosts 110 or other network resources. By way of example and not limitation, service 108 may be an online retailer, mapping service, internet advertising service, protein folding service, facial recognition service, etc.

To facilitate datacenter templates, in one implementation, service 108 may be written without making assumptions about what environment, or in what locale, the service will execute in. This allows the service to be dynamically executed across a variety of systems. The code may also be written without any assumptions about where the data it is intended to access is located. For example, a database may be separate from the processing function allowing optimization of resources. The code may be written to allow for multiple independent copies to be executed simultaneously, with the code handling the possibility that it may execute more than once. Finally, the code may be written to allow for the possibility that the result it generates will not be completely accurate according to the absolutely latest version of the data it uses.

Examples of such tradeoffs between latency and correctness include an online airline reservation system. The reservation system cannot guarantee that in the time it takes a user to decide to make a reservation that the seat they are reserving has not been booked to another customer. If this happens, then the reservation system has overbooked the flight, which has a cost that the airline is willing to pay (e.g., offering benefits to customers willing to switch flights). Another example of the latency/correctness tradeoff is an online news service. In fast breaking news, the information is not updated instantaneously, so the information available from a news site might be 10-30 minutes out of date. A similar situation may also occur in an online stock purchasing system. In all these cases, some mitigation is useful in the corner cases where unexpected things happen (e.g., the price of the stock drops dramatically in the period of a few minutes).

Business manager 104 may have in mind several requirements in how the service 108 is to be provided by service host 110. Service host 110 provides the architecture necessary for service 108 to run. Traditionally, the business manager 104 may have little knowledge of the operational capabilities of service host 110. Likewise, the service host 110 had limited information about the requirements of the service provider 102. With a traditional SLA these requirements may have been coarsely defined, and may only exist as a conversation between the two, which were never codified, and were thus easily lost. Furthermore, traditional SLAs were based on facilities and networks with a "five nines" mentality which scaled up by adding resources to particular nodes (such as smaller and more remote datacenters) or datacenters. However, these complete infrastructure systems are redundant and expensive. In contrast to scaling up, next generation datacenters scale out by adding additional nodes to provide availability.

Business manager 102 may access an execution template manager (ETM) 112. The ETM 112 may provide business manager 104 with a selection of execution templates from an execution template library 116, such as maximum profitability, maximum sustainability, etc. Available templates are discussed in more detail below with respect to FIG. 2. ETM 112 may also provide cost and performance estimates based on those execution templates.

An operations manager 118 may be responsible for maintaining the overall health of service host 110's overall architecture. Operations manager 118, or an automated process, may provide constraints to the ETM 112 based on current and projected conditions of the architecture.

Once the business manager 104 has reviewed the potential execution templates and selected and/or modified one to meet the necessary requirements for service 108, an execution template 114 is generated. Execution template 114 may include environmental restrictions, geolocation restrictions, latency requirements, etc, and is discussed in more depth below with regards to FIG. 3. This execution template, as well as the code and/or executable for service 108 are provided to an execution optimizer 120.

The execution optimizer 120 utilizes information about service 108, execution template 114, and access data 126 to build an optimized execution plan 122. Access data 126 may include which service components have been requested, actual latency of response, actual throughput of a datacenter, and so forth. Access data 126 is describe in more detail below with regards to FIG. 5.

Execution optimizer 120 may utilize several inputs including service 108, execution template 114, and access data 126 to generate an execution plan 122. Execution optimizer 120 is discussed in more depth below with regards to FIG. 4. While shown internal to service host 110, ETM 112 and/or execution optimizer 120 may be provided by a third party.

Once execution plan 122 is generated, it is used to deploy service 108 across network resources 124(1), . . . , 124(S). As used in this application, letters within parentheses, such as "(S)" or "(C)", denote any integer number greater than zero. While shown internal to service host 110, network resources 124(1)-(S) may be provided by one or more third parties. For example, service host 110 may be unable to provide a specialized payment processing function called for by service 108, thus this function may be accomplished using another service provider.

Once service 108 has been deployed across network resources 124(1)-(S), network 128 may be used to provide service customers 130(1), . . . , 130(C) with access to service 108 and/or allow communication with remote network resources 124. Network 128 may be any type of communication network, including the Internet, a local area network, a wide area network, a wireless wide area network (WWAN), a cable television network, a wireless network, a telephone network, etc.

Execution Template

Figure 2:
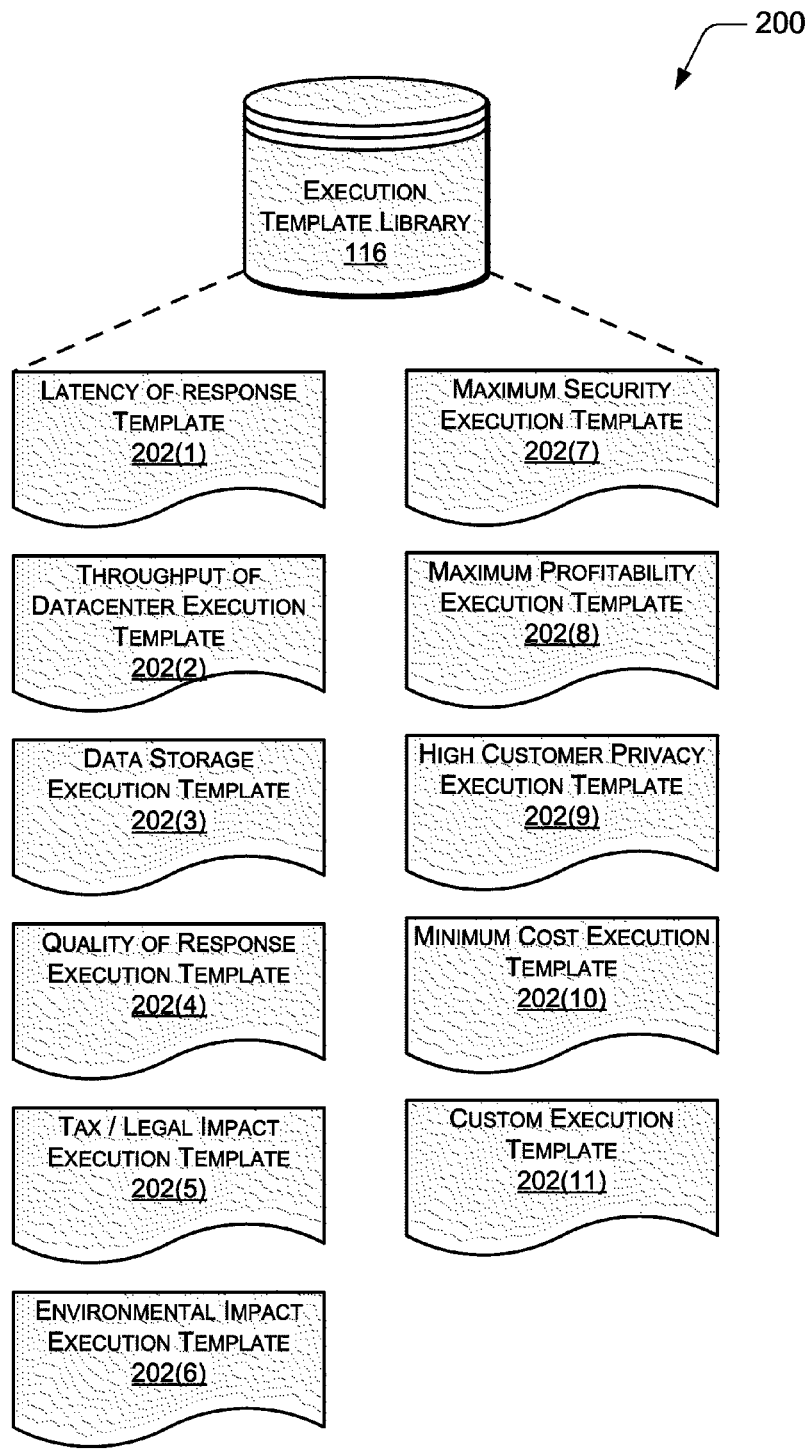
FIG. 2 is a block diagram illustrating selected examples of execution templates stored in an execution template library.

FIG. 2 shows execution templates stored in execution template library 116. As described in more depth below with respect to FIG. 3, execution template 114 encodes various implementation constraints and operational aspects relating to the code of service 108. Compared to the traditional SLA, these execution templates provide a rich set of considerations for a service provider 102 to consider or specify, and a service host 110 to deliver. For discussion purposes, a selection of execution templates stored in execution template library 116 are now described.

A latency of response execution template 202(1) may be available. For example, this template would optimize the overall latency distribution, target latency distribution for specific customers, shift data to datacenters closer to the user, etc. In one implementation, this may take a declarative form as follows:

```
Execute Service.Open(Customer: c, Data: d)
    overall latency distribution= "best effort",
    where c.CustomerType = "gold" set latency
    threshold < 50 milliseconds,
    data placement = "closest"
```

Template 202(1) Declaration Example

A throughput of datacenter execution template 202(2) may be available. For example, this template would focus on the scalability of the service with respect to a fixed set of resources.

A data storage execution template 202(3) may be available. In one implementation, this allows specification of assumptions regarding the importance of data and the cost of data loss. For example, lossy compression might be used for storing backup instances of photos/videos if it was deemed sufficiently unimportant to maintain full copies.

A quality of response execution template 202(4) may be provided. In some services, it may be an appropriate business goal to provide reduced response quality for improved latency. For example, in a mapping service, it is more important to provide real-time responses than it is to make sure that traffic updates are up-to-the-minute.

A tax or legal impact execution template 202(5) acknowledges jurisdictional differences. While it is better if developer 106 is not required to take into account the tax implications of service 108, laws regarding requirements about audit trails, national boundaries, tax consequences etc. may have a significant impact on the business of the service provider 102. Capturing these requirements in a form that is not contained in the service 108 code itself allows re-optimization of the implementation as such requirements change. Unlike the traditional SLA, such changes may be done quickly and also provide awareness to the service host 110 of conditions which might otherwise go unheeded. This is particularly valuable in the context of the current rapid changes in business models, political and legal shifts, and social changes.

An environmental impact (or "green") execution template 202(6) may be provided. There is a class of service providers, service hosts, and service customers that value environmental sustainability and will trade performance impacts against reduced environmental impact. Note that this is not the same as specifying the "lowest overall cost" because environmental sustainability may in fact increase costs. For example, a particular datacenter that uses wind power might be preferred to one that does not even though it costs more to use it. Thus, this template may seek to maximize environmental sustainability by preferring network resources powered by renewable resources, having lowest power consumption, lowest carbon footprint, etc.

Service provider 102 may choose a maximum security execution template 202(7). For example, this template may seek to minimize transmission of data over international communication links, require storage of data on highly secure storage devices in appropriate facilities, and require all data transfers be encrypted.

Where profitability is a concern, service provider 102 may select a maximum profitability execution template 202(8). In one implementation, this template may try to maximize profitability by using more expensive resources to minimize customer delays under certain conditions, such as during a holiday.

A high customer privacy execution template 202(9) may be provided. For example, this template may seek to maximize anonymity of service customers 130 by placing data in other countries, splitting transactions across multi-national network resources, not logging service provider customer-specific information, etc.

Where cost is a concern, service provider 102 may select a minimum cost template 202(10). In one implementation, this template may try to minimize overall costs by shifting processing to network resources which are cheapest, increasing latency to service customers which are consuming disproportionate quantities of resources, minimizing redundancy, etc.

Finally, custom execution templates 202(11) are possible. A service provider 102 may choose to combine multiple templates, modify an existing template, or otherwise set forth the statements regarding execution of their service.

Figure 3:
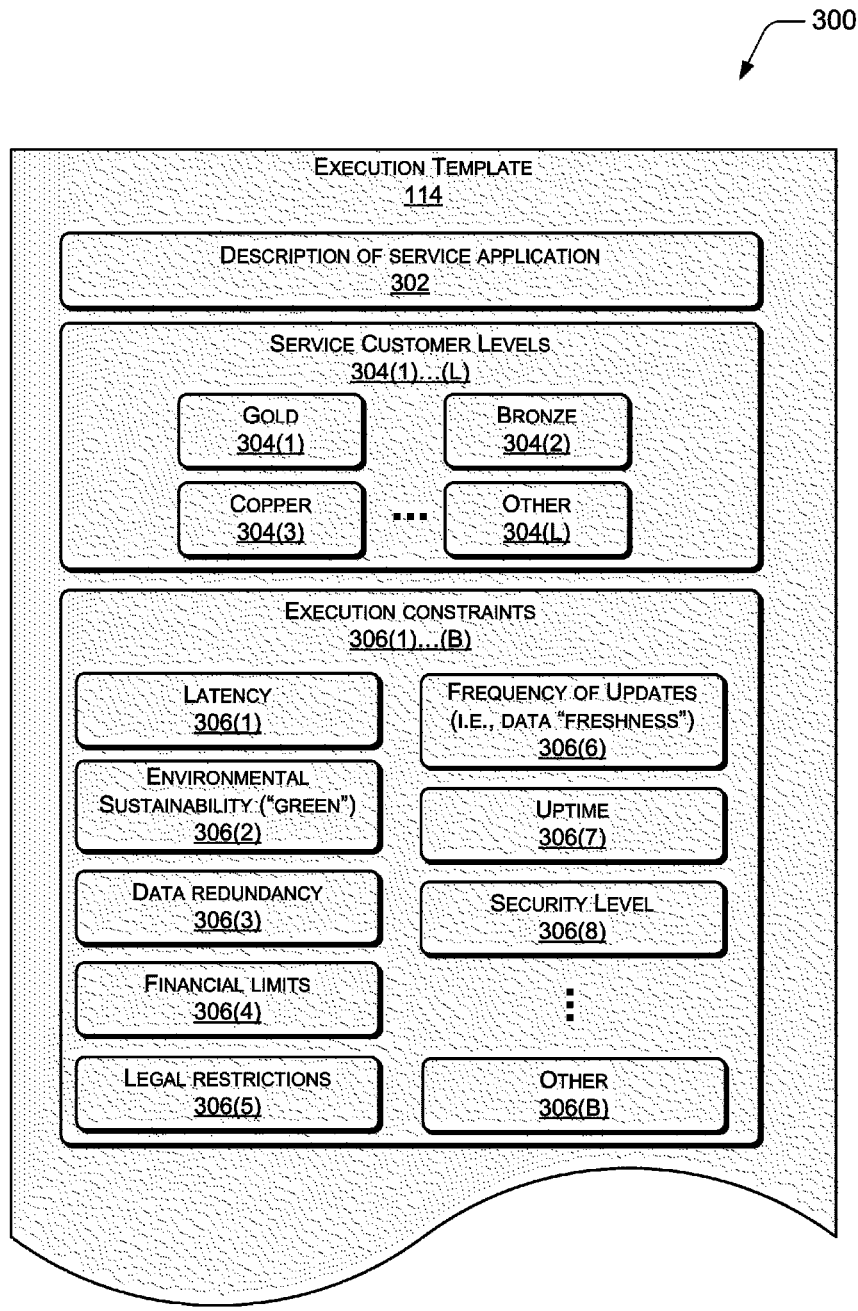
FIG. 3 is a block diagram illustrating selected portions of an example execution template.

FIG. 3 illustrates selected portions of an illustrative execution template 114 from FIG. 1. Assume the service 108 is an online wholesaling service to service customers in North America. Execution template 114 encodes various implementation constraints and operational aspects relating to the code of service 108 and the online wholesaling business of service provider 102. Execution template 114 may contain a description of the service application 302. This description may include one or more service graphs, textual descriptions, lists of required application programming interfaces (APIs), etc.

Execution template 114 may also contain service customer levels 304(1), . . . (L). For example, there may be "gold" level 304(1) customers who pay a premium for service, "bronze" level customers 304(2) who pay a minimal amount for service, "copper" level customers 304(3) who pay nothing for service, and other levels 304(L).

Execution template 114 may also contain execution constraints 306(1), . . . , 306(B). For discussion purposes, the following constraints may be included.

Latency boundaries 306(1) may be defined in the execution template 114. For example, requests for web pages are to be provided between 20 and 100 milliseconds (ms).

Environmental sustainability 306(2) may be addressed. In one implementation, a service customer 130 may have the option to select a "green" plan which uses the minimal resources operating on renewable energy sources. As with any of these execution constraints, dynamic adjustment is possible. For example, as renewable energy resources vary in availability, the service may be executed on only those datacenters or devices which use renewable energy.

Data redundancy 306(3) may be constrained. For example, data of paying customers at Gold 304(1) and Bronze 304(2) levels may be replicated at one or more other datacenters, while data for Copper 304(3) level clients is not replicated. Furthermore, this constraint may also be varied dynamically. For example, where a natural disaster is anticipated, the constraint may be relaxed to replicate all customer data at other datacenters.

Financial limits 306(4) may be addressed. For example, a service provider 102 may wish to cap total costs at a certain monetary value per day, or utilize datacenters using power with the lowest rates.

Consideration of legal restrictions 306(5) is possible. For example, financial transactions may only be executed by processors located in Country B. In another example, a service provider 102 may choose to avoid execution in a particular jurisdiction to avoid taxes.

Frequency of data updates/data "freshness" 306(6) may be selected. For example, cached data may be permitted which is up to 30 minutes old. In another example, accuracy of results may be traded for speed of response, such as providing quick response to street navigation requests while only updating traffic conditions every hour.

Uptime 306(7) constraints may be specified. For example, service 108 must be available 99.99% of the time for paying customers (such as gold 304(1) and bronze 304(2)) and 99.0% for non-paying customers (such as copper 304(3)).

Service providers 102 may also specify a security level 306(8). For example, certain types of highly sensitive data such as payment information must only be stored in a highly secure storage location.

Other execution constraints 306(B) may be used, such as limiting tasks by geolocation, whether data should be moved to the code or code to the data, how many copies of data are required, whether use of out of date copies of code/data is permissible, etc.

Unlike clumsy traditional SLAs, the flexibility of the execution template 114 allows easy addition or modification. Business manager 104 may choose to rename a service level from "Copper" to "Antimony" by simply updating the execution template 114 in the execution template manager 112. Developer 106 may adjust or add new execution constraints 306 and have the service host 110 comply with those new execution constraints more easily than the traditional SLA's process of proposal, discuss, negotiate, implement.

Optimization of Execution Template

Figure 4:
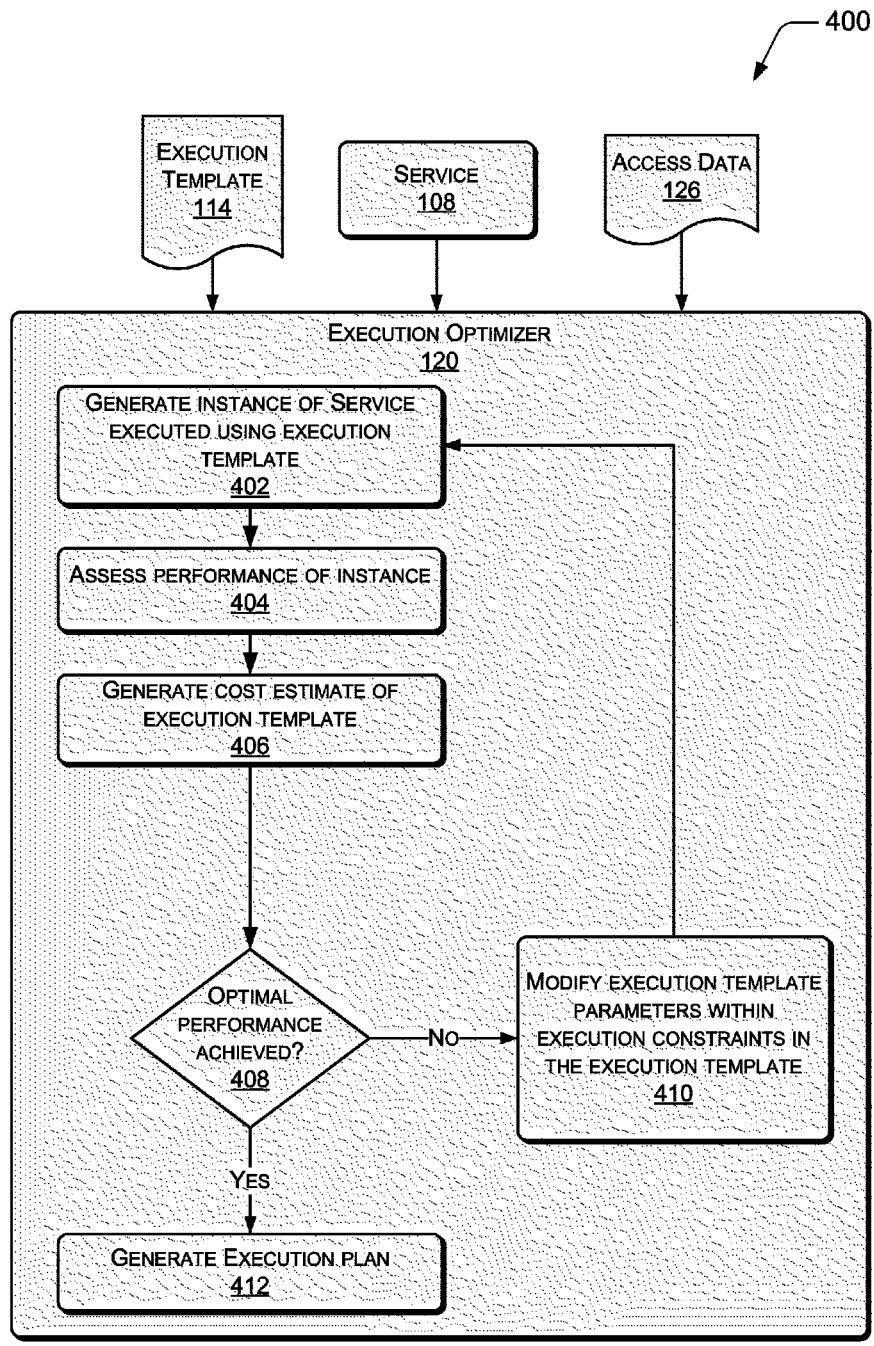
FIG. 4 is a flow diagram of an illustrative process of optimizing the selected execution template.

FIG. 4 shows an illustrative process 400 of optimizing the selected execution template 114 using execution optimizer 120. Process 400 may, but need not be, performed by the system of FIGS. 1-3, and is described in the context of FIGS. 1-3 for purposes of illustration, but not limitation. Optimization allows the abstraction provided by the execution template 114 to be effectively mapped in the execution plan 122 to the actual network resources 124(1)-(S), such as datacenters.

Execution optimizer 120 may receive multiple inputs to determine the optimal set of parameters in an execution template for a service 108. For discussion purposes, inputs include execution template 114, service 108, and access data 126. Access data 126 may be actual data from activity in the datacenter, simulated data generated for test purposes, etc. In another implementation, inputs may include a set of possible algorithms or strategies for generating competing execution plans. Strategies may include a "greedy" algorithm, exhaustive search of possible combinations, hill-climbing, simulated annealing, etc. For example, the "greedy" algorithm may compute a total cost, assign a single result, and recompute a total cost.

Once the inputs have been received, at 402 an instance of the service is generated and executed using execution template 114. This execution may take place in a designated portion of the datacenter(s), simulated datacenter, etc.

At 404, performance of the instance executing the execution template 114 may be assessed by the execution optimizer 120. For example, response times, processor requirements, cache hits, etc., may be determined and compared against the constraints and boundaries of the execution template 114.

At 406, a cost estimate of the service running under execution template 114 may be generated by the execution optimizer 120. This cost estimate may be used to compare performance and cost of one template against another as well as different execution plans for the same template As actual cost data is received from access data 126, the estimate may be updated to more closely reflect actual costs.

At 408 a determination is made by the execution optimizer 120 as to whether optimized performance within the execution template has been achieved. Optimized performance occurs when the maximum number execution template constraints 306(1)-(B) are closest to desired outcomes and are within the constraints placed by the execution template 114. When optimal performance is not achieved (i.e., the "No" branch of 408), at 410 the execution template parameters are modified within the execution constraints of the execution template 114 by the execution optimizer 120. This execution template with modified parameters is then returned to 402 for generation of an instance and assessment.

When optimal performance is achieved (i.e., the "Yes" branch of 408), at 412 the execution template is used by the execution optimizer 120 to generate an execution plan 122. This execution plan may include data and code specifying how the service is to be executed. The execution plan 122 is discussed in more detail below with regards to FIG. 6.

Illustrative Composition of Optimization Inputs

Figure 5:
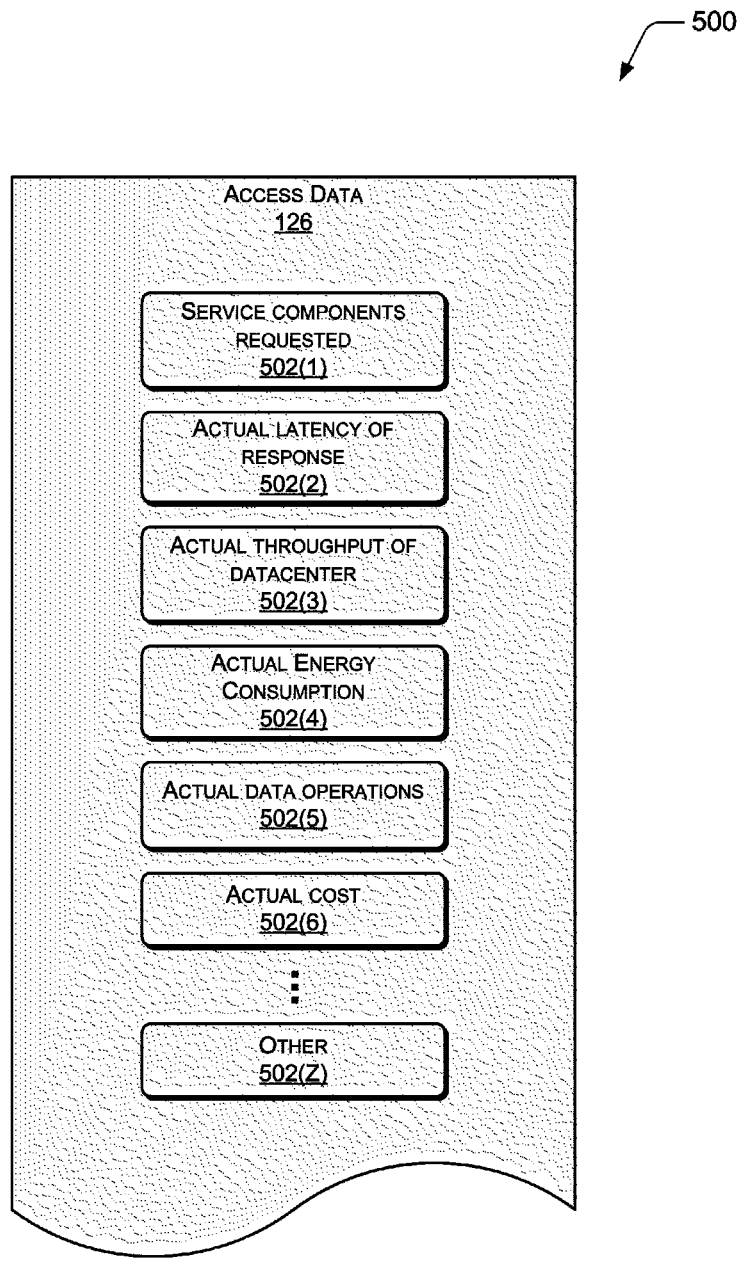
FIG. 5 is a block diagram illustrating selected examples of access data.

FIG. 5 is a block diagram illustrating selected access data 126 which may be used by execution optimizer 120 to optimize the execution template 114 for service 108. This ability to optimize was not possible with traditional SLAs given the limited information about services. With richer information about how a service is accessed, finer control becomes possible. For discussion purposes, this richer information in the form of access data 126 may include a variety of measurements.

Access data 126 may include which service components have been requested 502(1). For example, data regarding what portions of service 108 have been called most frequently. This information may be used to cache that component to increase response time.

Actual latency of response 502(2) may be determined. For example, how long responses to service customers 130 actually took. This information may be used by business manager 104 to determine customer experience, and by developer 106 and operations manager 118 to determine potential bottlenecks.

Actual throughput of the datacenter 502(3) may be determined. For example, datacenter "Stateline" was operating at 51% of available throughput. In particular, operations manager 118 may use this information to maximize usage of the datacenters and better allocate capacity.

Actual energy consumption 502(4) may be measured. For example, performing a processing task for 1000 users consumed 10 watts of electrical energy. This may be used by all parties to minimize power consumption, reduce overall costs, etc.

Measurements of actual data operations 502(5) performed. For example, what data was replicated between datacenters, how much data was read from remote storage, cache hits, etc. Knowledge of the ebb and flow of data throughout the datacenter(s) provides for better planning and management of resources. For example, perhaps datacenter A has a large data storage capacity, but is underutilized while datacenter B is at capacity.

Actual cost 502(6) of operations may also be part of access data 126. For example, what were the total financial costs of bandwidth, processor cycles, power, etc., which have been consumed.

Other access data 502(Z) may be used for optimization. For example, actual quality of response such as out of date information was delivered 35% of the time to users.

Illustrative Execution Plan

Figure 6:
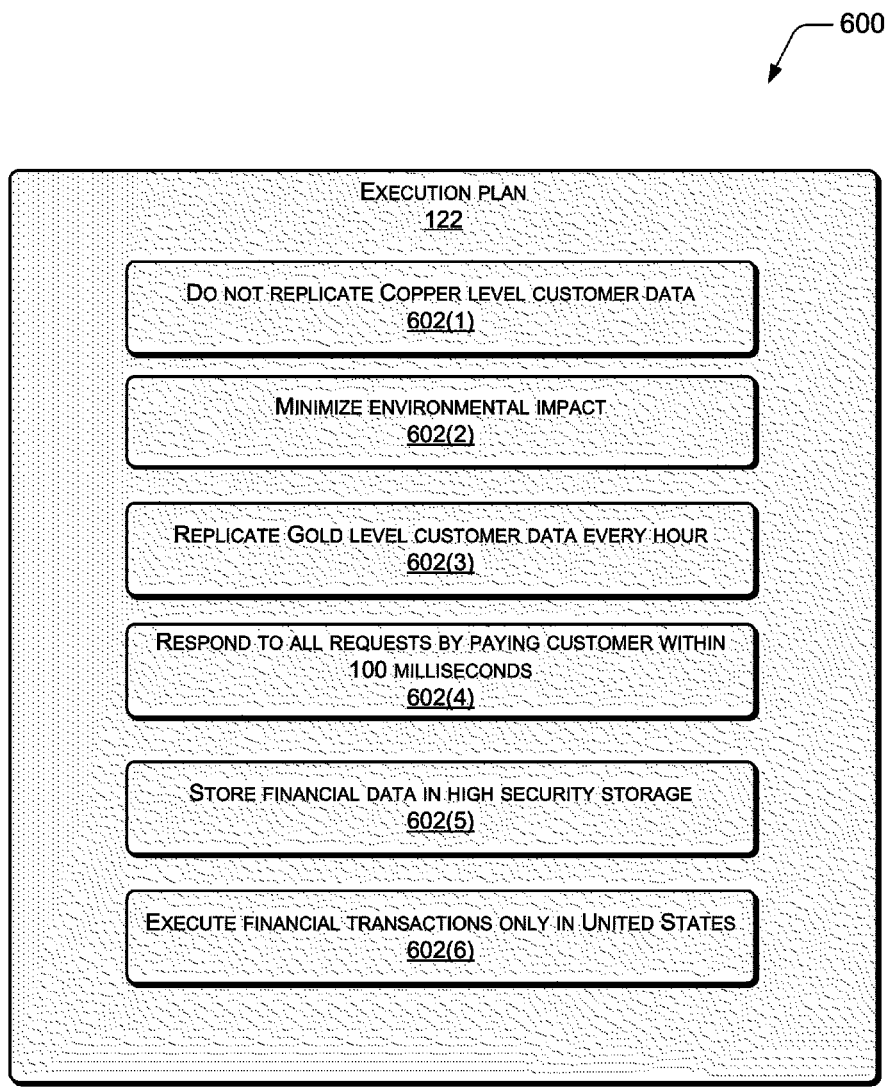
FIG. 6 is a block diagram illustrating selected example modules of an execution plan.

FIG. 6 is a block diagram illustrating selected modules of an execution plan 122. While execution plan 122 may operate with varying levels of granularity ranging from discrete hardware through multiple datacenters, for clarity and not by way of limitation, the execution plan 122 is described at a datacenter level. Where a traditional SLA might result in a written specification for datacenter administrators to use for deployment, a datacenter may automatically execute execution plan 122. Upon running execution plan 122, the network resources 124 act within execution constraints 306 which were provided by execution template 114. Execution plan 122 may be a script or other declarative structure. For discussion purposes, the following statements are described.

Execution plan 122 may specify "Do not replicate Copper level 304(3) customer data to other Datacenters" 602(1). This may be implemented because replication is expensive, and not considered worthwhile for customers who are not paying.

Execution plan 122 may also specify "Minimize environment impact" 602(2) by using the most sustainable, "greenest" resources. For example, using hardware with long life cycles and/or that use less power. Additionally or alternatively, the environmental impact script 602(2) may specify using a certain datacenter because it is powered by renewable energy sources.

"Replicate Gold level 304(1) customer data at least hourly" 602(3). Perhaps Gold customers pay a premium for service, and demand greater fault tolerance, calling for the increasing replication demand.

"Respond to all requests by paying customers within 100 milliseconds" 602(4). Thus, in this example, Gold 304(1) and Bronze 304(2) customers may be serviced out of closer, high performance datacenters while Copper customers are served from a more remote, less expensive, and less responsive datacenter.

"Store financial data in high security storage" 602(5). This may be in response to contract requirements from credit card companies, requiring certain levels of performance.

"Execute financial transactions only in a certain country" 602(6). This may result from a government regulation in one or more countries mandating such transactions occur only within the boundaries of the country. Or perhaps to realize tax advantages.

Implications of these statements in execution plan 122 on network resources 124 are illustrated in the following example.

Other execution plan statements may also be used. For example, "set transfer size of data items between datacenters" may be used. To minimize costs of datacenter-to-datacenter transfers, a minimum transfer size may be set to take advantage of the lower cost in transferring larger blocks, with a tradeoff of an increased delay in data accessibility to customers.

In another example, a "batch CPU tasks" statement may be implemented. Requests for CPU usage would be aggregated into a batch to improve CPU performance at the cost of increased latency to customers. Thus, 1,000 requests from "Copper" level customers may be batched together and be computed at one time. As a result, some of the requests are waiting in the queue while it is filling up, but the CPU is more efficiently used by handling many similar requests at once than one at a time.

Illustrative of Execution Templates

Figure 7:
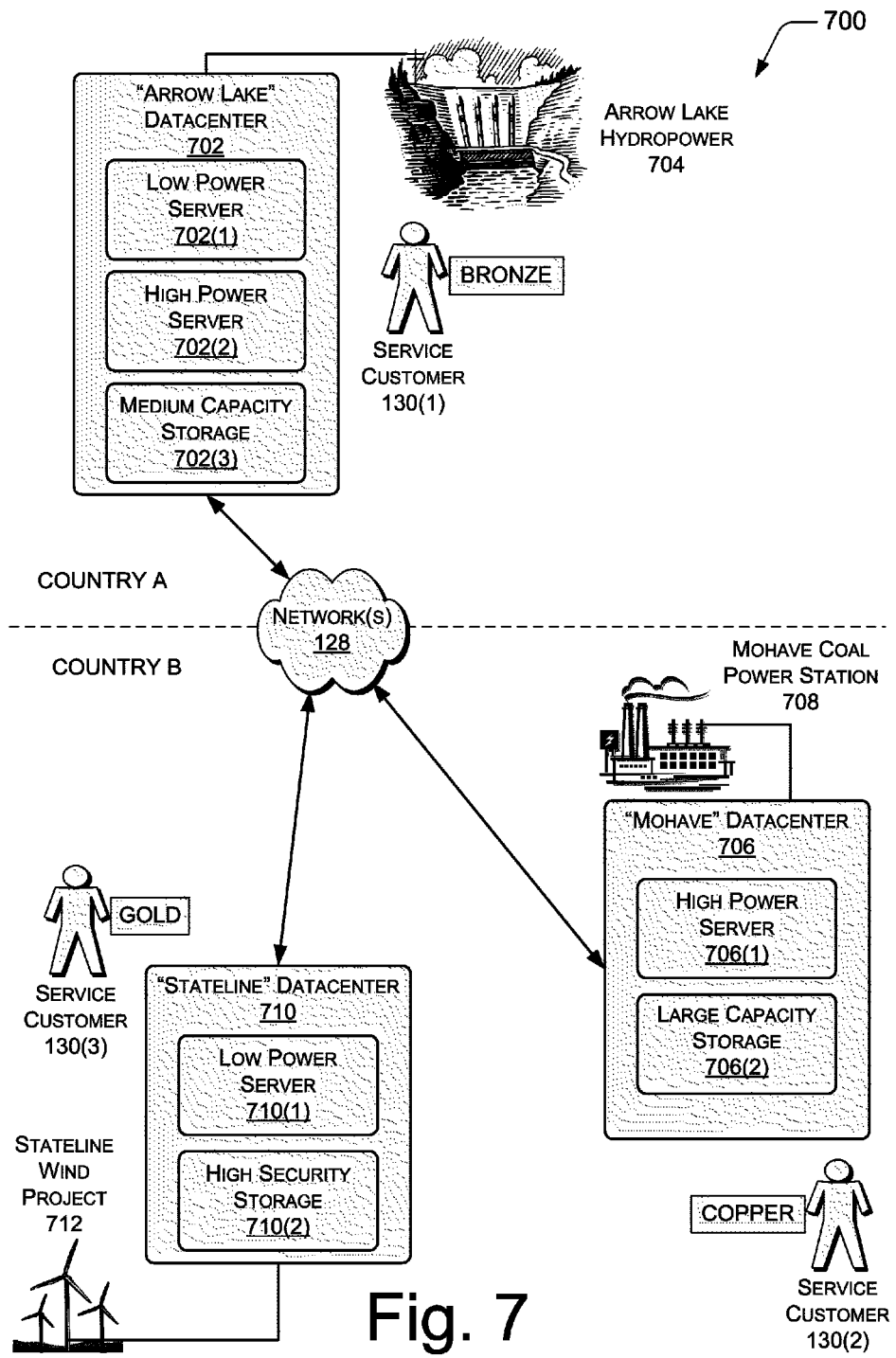
FIG. 7 is a block diagram of an illustrative environment describing the use of execution templates.

FIG. 7 is an illustration of execution templates in use based on the architecture and processes described in FIGS. 1-6. In this example, service provider 102 has contracted with service host 110 to provide an online wholesaling service 108 to service customers 130(1)-(C), including customers 130(1), 103(2), and 130(3) in North America. Service provider 102 wants to advertise their service as being environmentally friendly and highly secure. Thus, business manager 104 selected an execution template 114 which combined these attributes. The execution template 114 may also be modified to reflect the particular requirements of service provider 102. Estimated costs of execution template 114 were provided by the execution template manger 112 to business manager 104. Determining that these costs were suitable for the business model of service provider 102, business manager 104 approved the execution template, which was then optimized by execution optimizer 120 and an execution plan 122 was generated.

In this example, assume that there are three service customer levels for service customers 130(1)-(C). These are described above with respect to FIG. 3: "Gold" level 304(1) customers who pay a premium for service, "Bronze" level customers 304(2) who pay a minimal amount for service, and "Copper" level customers 304(3) who pay nothing for service 108.

These service customers 130 are distributed across North America. User 130(1) is a Bronze level customer who lives near the "Arrow Lake" datacenter 702 in Country A. The "Arrow Lake" datacenter 702 includes a low power server 702(1) suitable for simple tasks, a high power server 702(2) capable of handling computationally intensive tasks, and has medium capacity storage 702(3) for data. "Arrow Lake" datacenter 702 derives the majority of its power from the Arrow Lake hydroelectric plant 704. This power is moderately expensive, and also considered to be "green" because it is generated from a renewable source. "Arrow Lake" datacenter 702 also benefits from the cool climate of Arrow Lake, and does not require additional cooling equipment.

User 130(2) is a Copper level customer who lives near the "Mohave" datacenter 706 in Country B. The "Mohave" datacenter 706 includes a high power server 706(1) suitable for handling computationally intensive tasks, and has large capacity storage 702(2) for data. "Mohave" datacenter 706 derives the majority of its power from the Mohave coal power station 708. This power is generally moderately priced but may spike as coal prices change. Furthermore, the hot and dry climate in Mohave requires large, power hungry cooling equipment.

User 130(3) is a Gold level customer who lives near the "Stateline" datacenter 710, which is also in Country B. The "Stateline" datacenter 710 includes a low power server 710(1) suitable for simple tasks, and has high security storage 710(2) for data. "Stateline" datacenter 710 derives the majority of its power from the Stateline Wind Project 712 which uses wind turbines to generate electricity. This power is generally highly priced, but is considered highly sustainable and thus very environmentally friendly, or "green."

In this illustration, the datacenter environment comprises the three datacenters 702, 706, and 710, the network 128, and the access devices (not shown) of the service customers 130(1)-(C). Thus, any service customer 130 may access any resource in any datacenter via network 128.

Execution plan 122 contained the statements as described above with respect to FIG. 7. Execution plan 122 was deployed to the network resources 124, which in this illustration are datacenters 702, 706, and 710 and their corresponding components. Other network resources 124 such as routers, storage area networks, sensor nodes, etc., have been omitted from this illustration for clarity in presentation only.

Upon receipt of execution plan 122, each datacenter has reacted differently, in accordance with the statements present in execution plan 122. For example, no datacenter will replicate data for Copper level service customers, in keeping with statement 602(1). Execution plan 122 includes a priority to use the "Stateline" datacenter 710 when available, then "Arrow Lake" datacenter 702, and finally "Mohave" datacenter 706 when no other capacity is available given the statement to minimize environmental impact 602(2). Each datacenter will update Gold level data at least every hour 602(3). All requests by Gold and Bronze level customers will receive responses within 100 ms 602(4), thus tasks for service customers 130 may be moved the datacenters closest to the service customers 130. However, in the event of an outage of "Arrow Lake" datacenter 702, to maintain the requirement to respond within 100 ms 602(4), tasks may be handled by "Mohave" Datacenter 706 which has faster high power servers capable of making up for latency of network 128.

Furthermore, financial data involving transactions in high security storage 602(5) will be stored only at "Stateline" datacenter 710 as that is the only high-security storage area. Thus, requests to store financial data at any other datacenter would thus be refused. Finally, financial transactions are only to be executed in Country B 602(6) given current laws. Thus, only "Mohave" datacenter 706 and "Stateline" datacenter 710 may handle these transactions, even at the expense of greater environmental impact.

In practice, service customer 130(1) would thus have most of their requests processed at "Arrow Lake" datacenter 702 due to the low latency afforded by proximity, low environmental impact, and high power server capacity available. However, financial transactions of service customer 130(1) would be processed in Country B, and financial data would be stored only at "Stateline" datacenter 710.

Data for non-paying service customer 130(2) would be stored at "Arrow Lake" datacenter 702 because of the greater environmental benefits 602(2) and as the 100 ms requirement 602(4) does not apply. Furthermore, in the event of an outage of "Arrow Lake" datacenter 702, service customer 130(2)'s data would be unavailable due to the prohibition on replicating Copper level customer data 602(1) to other Datacenters.

Gold service customer 130(3) would see most tasks performed at "Arrow Lake" datacenter 702 for the reasons given above with respect to service customer 130(1). However, unlike service customer 130(2), in the event of a failure at "Arrow Lake" datacenter 702, service customer 130(3)'s data would have been replicated to, and available from, "Mohave" datacenter 706. Thus, service customer 130(3) would not experience a service outage.

Assume that over time the requirements of service provider 102 have changed, as well as the legal environment and capabilities of the datacenters. A new treaty now permits financial transactions for Country B residents to be processed in Country A. "Arrow Lake" datacenter 702 has been upgraded to include a high-security storage capability. "Mohave" datacenter 706 now is powered entirely by solar panels after burning coal was banned. Customers in a new "Platinum" customer service level are willing to pay a premium for response times less than 50 millisecond. Finally, access data 126 from users indicates "Stateline" datacenter 710 suffers frequent outages due to lulls in the wind which turns the wind turbines.

Rather than re-coding service 108 to reflect these changes and re-deploying across the network resources 124, service provider 102 may simply update their execution template 114 with the new requirements. Execution optimizer 120, recognizing these changes in service provider 102 requirements and of the network resources 124, constructs a new execution plan optimized to the new conditions.

For example, because financial transactions may occur in Country A and the "Arrow Lake" datacenter 702 now has high security storage, this datacenter takes on more tasks, including many of those previously handled by the unreliable "Stateline" datacenter 710. A larger percentage of tasks which are processor intensive may now be balanced to the new "greener" "Mohave" datacenter 706, rather than only being used as a last resort. Data for Platinum customers is distributed to the closest datacenter and additional cache resources are allocated at each to meet the new response time requirements.

Figure 8:
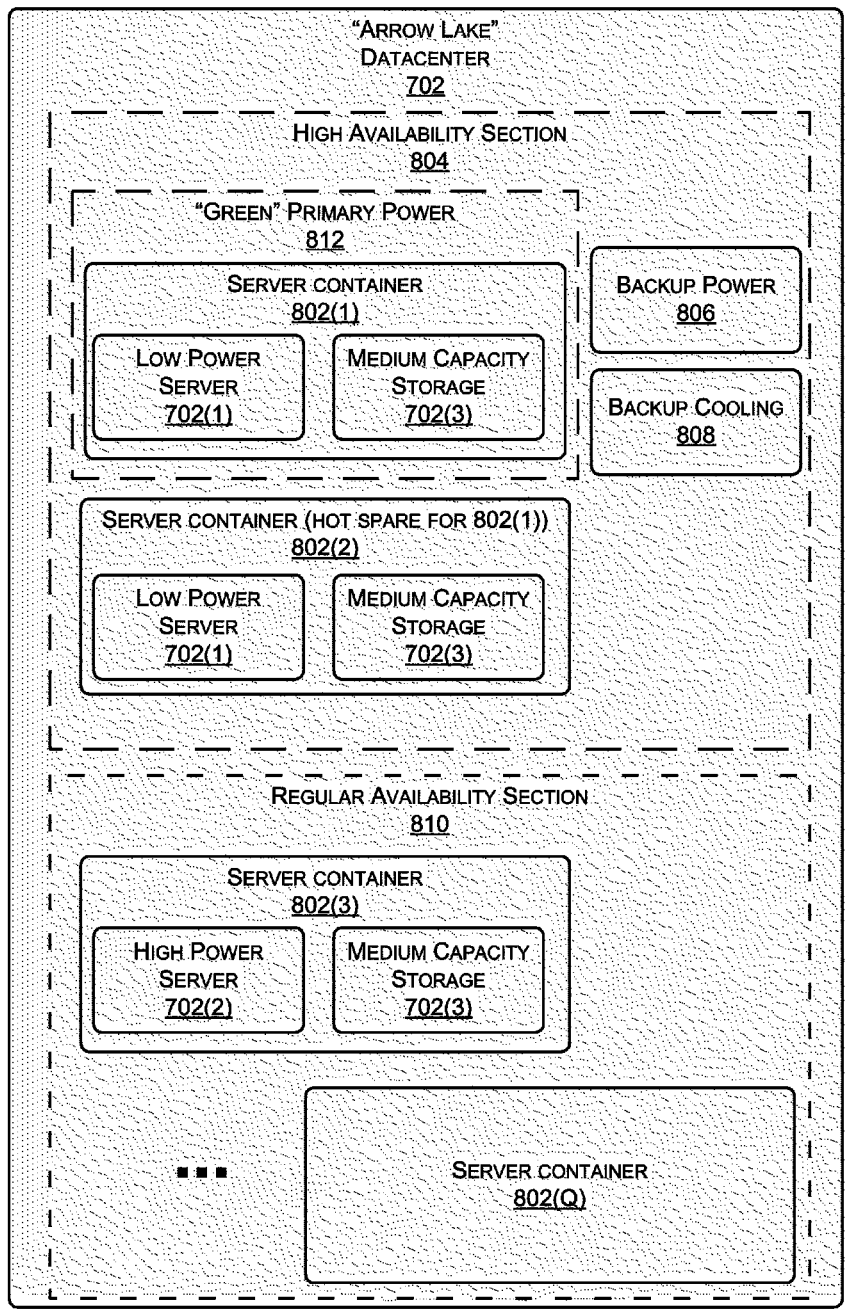
FIG. 8 is a block diagram illustrating one example datacenter from FIG. 7, which incorporates multiple sections and containers.

FIG. 8 illustrates one possible configuration of the "Arrow Lake" datacenter 702 from FIG. 7. In this example, datacenter 702 may include one or more server containers 802(1), 802(2), 802(3), . . . , 802(Q) housing network resources. Datacenter 702 may comprise a combination of operational elements including containers, pallet modules, rack modules, servers, blades, and so forth. Server containers 802(1) and 802(2) in this illustration include low power server 702(1) and medium capacity storage 702(3). Server container 802(3) includes high power server 702(2) and medium capacity storage 702(3).

Datacenter 702 may be divided into various physical and/or logical sections. As discussed earlier, execution template 114 and execution plan 122 may operate at levels of granularity includes these sections and/or discrete components within them. Shown here within datacenter 702 is a high availability section 804, indicated with a broken line. Operational elements such as server container 802(1) and 802(2) within this high-availability section 804 benefit from additional infrastructure to maximize uptime. For example, server container 802(1) has a redundant server container 802(2) to provide a hot spare which is available to take over the functions of 802(1) in the event of a failure. A backup power 806 system such as a battery bank and generator are available to handle electrical outages. A backup cooling system 808 is also available should a primary cooling system fail.

Datacenter 702 may also include a regular availability section 810, indicated in this illustration by an alternating dotted and dashed line. Operational elements such as server containers 802(3)-(Q) within this section do not enjoy the additional infrastructure provided in the high availability section 804. For example, in the event of a power outage, server containers 802(3)-(Q) in the regular availability section 810 would be offline as they are not connected to backup power 806.

Datacenter 702 may be divided into various other sections, such as a "green" section 812 which utilizes renewable power sources, a high security section having more stringent physical security barriers and restricted access to personnel, etc.

The execution templates described in this application have operated at a datacenter level. However, execution templates may act on a variety of levels including collections of datacenters, individual datacenters, containers, modules, and discrete hardware. This additional granularity provides flexibility to the management of service 108 within the boundaries of execution template 114.

For example, server container 802(1) in the "Arrow Lake" datacenter 702 may normally operate on solar power, and thus reside within a "green" section of the datacenter. Execution plan 122 may be extended to a container level within the datacenter. Given execution plan 122's statement 602(2) to minimize environmental impact, resources in server container 802(1) may be preferred for use over those of server container 802(3) running in the non-"green" section in the same datacenter 702, or even non-"green" sections in other datacenters.

CONCLUSION

Although specific details of illustrative methods are described with regard to the figures and other flow diagrams presented herein, it should be understood that certain acts shown in the figures need not be performed in the order described, and may be modified, and/or may be omitted entirely, depending on the circumstances. As described in this application, modules and engines may be implemented using software, hardware, firmware, or a combination of these. Moreover, the acts and methods described may be implemented by a computer, processor or other computing device based on instructions stored on memory, the memory comprising one or more computer-readable storage media (CRSM).

The CRSM may be any available physical media accessible by a computing device to implement the instructions stored thereon. CRSM may include, but is not limited to, random access memory (RAM), read-only memory (ROM), electrically erasable programmable read-only memory (EEPROM), flash memory or other solid-state memory technology, compact disk read-only memory (CD-ROM), digital versatile disks (DVD) or other optical disk storage, magnetic cassettes, magnetic tape, magnetic disk storage or other magnetic storage devices, or any other medium which can be used to store the desired information and which can be accessed by a computing device.

What is claimed is:

1. A method of optimizing a service across networked resources, the method comprising:

presenting a plurality of execution templates stored in memory comprising declarative statements regarding execution of a service across network resources;

receiving a selection of an execution template for deployment via a communication device;

optimizing the execution template for use with the service, comprising:

generating an instance of the service executed using the selected execution template;

running the instance on the network resources; and assessing performance of the instance based at least in part on actual data received from a plurality of measurements from running the instance on the network resources;

generating an execution plan from the execution template for the service on the processor when the assessed performance of the instance with respect to energy consumption by the networked resources is within an energy consumption threshold; and deploying via the communication device the service across the network resources according to the execution plan.

2. The method of claim 1, wherein assessing performance of the instance is further based upon at least one of the following:

latency of response of the service;

throughput of data through the service;

data storage and processing requirements of the service;

quality of response of the service;

legal implications of execution of the service; or environmental impact based on consumption of natural resources to deploy the service.

3. The method of claim 1, further comprising determining the costs of the deployment and presenting alternative execution templates for comparison.

4. The method of claim 1, wherein the networked resources comprise datacenters.

5. The method of claim 1, further comprising modifying the selected execution template.

6. The method of claim 1, wherein the execution template incorporates parameters set forth in a service level agreement.

7. The method of claim 1, further comprising:

adjusting execution template parameters of the execution template within execution template constraints when the performance of the instance with respect to energy consumption is not within the energy consumption threshold.

8. A system comprising:

a processor;

a memory coupled to the processor;

an execution template manager module stored in the memory and executable on the processor to present execution templates to a user for selection by the user of a one of the execution templates, the execution templates for deploying a service across network resources;

an execution module stored in the memory and executable on the processor to execute the selected execution template of the service on the network resources;

an execution optimizer module stored in the memory and executable on the processor to assess performance of the service using an execution template based at least in part on actual data received from a plurality of measurements of the service executing on the network resources, and to generate an execution plan based at least in part on the assessed performance of the service with respect to energy consumption by the network resources being within a threshold.

9. The system of claim 8, wherein the execution template is modified when the assessed performance is not within the threshold.

10. The system of claim 8, wherein the network resources may be controlled and/or owned by different entities.

11. The system of claim 8, further comprising a communication module stored in the memory and executable on the processor to deploy the service across the network resources.

12. The system of claim 8, wherein the execution template manager module determines an estimated cost of the service.

13. One or more computer-readable storage devices storing instructions that, when executed by a processor cause the processor to perform acts comprising:
   presenting, to a user, one or more execution templates of a service for deployment across network resources;
   receiving, from the user, selection of a one of the execution templates;
   generating an execution plan of the service from the execution template in response to determining that performance of the service using the execution template is within a threshold; and
   adjusting execution template parameters within execution template constraints when the performance of the service using the execution template is not within the threshold.

14. The computer-readable storage devices of claim 13, further comprising:
   generating an instance of the service executed using the execution template;
   running the instance on the network resources;
   optimizing the execution template for at least one of the following:
      latency of response of the service;
      throughput of data through the service;
      energy consumption by the network resources;
      data storage and processing requirements of the service;
      quality of response of the service;
      legal implications of execution of the service; or
      environmental impact based on consumption of natural resources to deploy the service.

15. The computer-readable storage devices of claim 13, further comprising deploying the service according to the execution plan.

16. The computer-readable storage devices of claim 13, wherein the execution template comprises declarative statements regarding execution of the service.

17. The computer-readable storage devices of claim 14, wherein optimizing the execution template is further based at least in part on actual data received from a plurality of measurements from running the instance on the network resources.

18. The computer-readable storage devices of claim 13, wherein the execution template incorporates parameters set forth in a service level agreement.

19. The system of claim 8, wherein the assessed performance of the service is based at least in part on:
   energy consumption by the network resources.

20. The system of claim 8, wherein the assessed performance of the service is based at least in part on legal implications of execution of the service.

* * * * *